United States Patent Office 3,563,767
Patented Feb. 16, 1971

3,563,767
MARGARINE CONTAINING POLYAMIDE
David Wasserman, Springfield, N.J., John D. Garber, Hinsdale, Ill., and Frederick M. Meigs, Summit, N.J., assignors to Merck & Co., Inc., Rahway, N.J., a corporation of New Jersey
No Drawing. Continuation of application Ser. No. 647,598, June 21, 1967, which is a division of application Ser. No. 341,424, Jan. 30, 1964. This application Mar. 8, 1968, Ser. No. 711,812
Int. Cl. A23d 3/00
U.S. Cl. 99—123                                                  8 Claims

ABSTRACT OF THE DISCLOSURE

Novel homo- and co-polypeptides useful in a wide variety of different and unrelated arts. Methods for producing said polypeptides via a novel N-carboxy anhydride consisting of condensing said N-carboxy anhydride with one or a mixture of two or more N-carboxy anhydrides to produce novel homo-polymers and co-polymers. Novel compositions of matter in which one or more of said novel polypeptides is present as a component.

---

This application is a continuation of application Ser. No. 647,598, filed June 21, 1967, now abandoned, which is in turn a division of application Ser. No. 341,424, filed Jan. 30, 1964, and now abandoned.

This invention relates to novel compounds and to novel polyamides or polypeptides and methods for producing them and also novel compositions of matter in which one or more of said polypeptides are present as components thereof and to methods for producing said novel compositions of matter. In one of its more specific aspects, the present invention is directed to novel N-carboxy anhydrides and to polyamides or polypeptides produced therewith and to novel compositions of matter in which one or more of said novel polyamides or polypeptides are present as components thereof and to methods for preparing them.

The novel N-carboxy anhydrides of the present invention are of the following generic Formula:

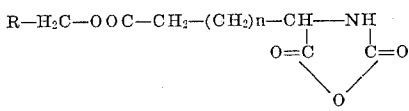

with R being a straight or branched chain alkyl radical of at least 7 carbon atoms and preferably 11–21 carbon atoms and $n$ being 0 or 1. Said novel N-carboxy anhydrides have unique and unexpected properties, among which are the following: they are soluble in aliphatic hydrocarbons, such as heptane, kerosene, lubricating oils, mineral spirits, etc. at 50° C. Said mineral spirits used has a boiling range of 161°–197° C. and has a Kauri-Butanol Value of 39 and is available on the market as "Varsol 1," a product of Humble Oil & Refining Company and is described in its bulletin "Lubetext DG–1P" dated Oct. 5, 1962. Said novel anhydrides are soluble in 10% (w./v.) concentration in dry hexane at 50° C. They have the further unique characteristics of imparting novel, unexpected and unique properties to novel polymers produced therewith.

Said novel polymeric materials are unique polyamides which have unique and unexpected properties and are useful in a wide variety of different and unrelated arts. They have the unusual and unexpected properties of (1) being soluble in hydrocarbons and in at least 0.1% (w./v.) concentration in said mineral spirits at 75° C., and (2) being soluble or dispersible in (a) normally liquid and normally solid hydrocarbons, (b) oils and fats of animal or vegetable origin either unhydrogenated or hydrogenated, (c) natural waxes, (d) hydrocarbyl esters of fatty acids of at least 9 carbon atoms and (e) mixtures of two or more of (a)–(d). Said hydrocarbons are aliphatic, cycloalphatic, aromatic or aliphatic-aromatic and are monomeric or polymeric and illustrative examples of some of them are those hereinbefore recited, petroleum oil and fractions thereof, petroleum oil jellies, paraffin waxes, montan wax, etc., benzene, alkyl benzene, toluene, xylenes, naphthalene, and benzyl, dimethyl, and ethyl naphthalenes, etc., anthracene, polyolefins, such as polyethylene, polypropylene, polystyrene, etc. Examples of some of said oils and fats are tallow, lard, etc. and fractions thereof, cottonseed, soybean, olive, rapeseed, safflower, peanut, corn, fish, seal, whale, etc. oils and fractions thereof and said oils and fats and fractions thereof which have been partially or completely hydrogenated. Examples of some of said natural waxes are carnauba wax, beeswax, spermaceti. Examples of said hydrocarbyl esters are the aliphatic, such as methyl, ethyl, isopropyl, allyl, stearyl, etc., or aromatic, phenyl, benzyl, etc. esters of fatty acids such as those derived from said vegetable and animal oils and having at least 9 carbon atoms. Said novel polyamides are combined with said substances (a)–(d) in amount at least sufficient to increase the viscosities of said respective substance at temperatures slightly, that is, about 3° C., above their melting points. In general, said polyamides are combined with said substances (a)–(d) in the ratio by weight of 0.05–25 parts of the former to 100 parts of the latter depending upon the substances (a)–(d) and the effect desired. When said substances are normally liquid, they may be thickened to the desired viscosity. Their viscosities (Brookfield) at 25° C. may be increased 100% or more up to the semi-solid state or to the solid state of the desired firmness or rigidity by varying the proportion of the polyamide combined therewith. Said polyamides are combined with mineral lubricating oils to improve the viscosity index and/or lower the pour point thereof. They are combined with normally liquid edible oils or blends of normally solid or semi-solid edible fats and/or hydrogenated vegetable oils in normally liquid edible oils to increase their viscosities (Brookfield) at 25° C. 100% or more up to solid forms such as solid shortening or margarine-like products of improved appearance. They may be used to incorporate water in hydrophobic liquids and therefore are useful as emulsifiers for fats and oils in the baking industry. They are combined with normally liquid hydrocarbons, such as gasoline, kerosene, etc. to convert them into thickened or solid fuels for heating purposes. They are combined with normally liquid hydrocarbon components to produce "Napalm" bombs. They may be combined with the liquid rocket fuels to convert them into less dangerous solid fuels or propellants by using a more active solvent or ultra sonic waves to dissolve or disperse them in the normally liquid hydrocarbon. They are combined with natural waxes and hydrocarbon waxes and with normally solid polymers of unsaturated hydrocarbon monomers to increase their flexibility characteristic and to decrease the brittle points thereof. In addition they impart toughness to the waxes. They are combined with mineral oils to provide ashless greases.

Another object of this invention is to provide novel N-carboxy anhydrides.

A still further object of this invention is to provide novel N-carboxy anhydrides which when one or a mixture of two or more of them are condensed with the evolutions of carbon dioxide gas provides unique homo-polymers and copolymers.

A still further object of this invention is to provide novel polyamides.

A still further object of this invention is to provide homopolymers and copolymers from said novel N-carboxy anhydrides.

A still further object of this invention is to provide normally liquid oils of vegetable or animal origin in combination with minor amounts of said novel homopolymers and/or copolymers to increase the viscosity thereof at 25° C. by at least 100% and to values up to those of a gel or solid.

A still further object of this invention is to provide mineral oils in combination with minor amounts of said polymers and/or copolymers to increase the viscosity and lower the pour point thereof.

A still further object of this invention is to provide normally liquid hydrocarbons, such as kerosene, gasoline, mineral spirits, petroleum oils, and normally liquid fractions thereof with minor amounts of said novel homopolymers and/or copolymers to convert them into gels, or semi-solid or solid products.

A still further object of this invention is to provide novel compositions of matter comprising natural and/or mineral waxes in combination with minor amounts of said novel polymers and/or copolymers to impart flexibility and toughness thereto and to increase the viscosity thereof at temperatures above the normal melting temperature thereof.

A still further object of this invention is to provide novel compositions of matter comprising normally solid polyolefins, such as polyethylene and polypropylene, in combination with minor amounts of said novel polymers and/or copolymers to improve the flexibility and to reduce the brittle temperature thereof.

A still further object of this invention is to provide novel processes for producing novel polyamides.

A still further object of this invention is to provide novel methods for producing novel homopolyamides.

A still further object of this invention is to provide novel methods for producing novel copolyamides.

These, as well as other objects of this invention, will be apparent from the following description.

Said compounds within generic Formula I are individually subjected to condensation-polymerization reactions accompanied by the evolution of carbon dioxide gas to provide polypeptides which are homopolyamides and each of which consists essentially of a recurring unit selected from the group of units within the generic Formula A:

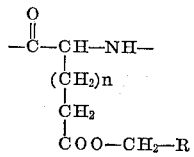

with R and $n$ being as before defined.

A mixture of a plurality, that is, two or more, of the compounds within generic Formula I differing from each other in the number of carbon atoms therein and/or by the values of $n$ thereof and/or in the number of carbon atoms in the R radicals thereof are subjected to condensation-copolymerization reactions accompanied by the evolution of carbon dioxide gas to provide polypeptides which are polyamide copolymers, each of which consists essentially of units selected from the group of units differing from others therein in the number of carbon atoms therein and/or by the values of $n$ thereof and/or in the number of carbon atoms in the R radicals thereof.

Other polyamide copolymers are produced by subjecting to condensation-copolymerization reactions accompanied by the evolution of carbon dioxide gas a mixture of (a) at least one of the compounds within generic Formula I and (b) at least one of the N-carboxy anhydrides of at least one other than those within said generic Formula I but characterized by having therein the same group

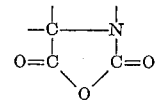

as that of compounds within said generic Formula I. Examples of some of the latter are the N-carboxy anhydrides of: glycine, α-alanine, α-amino butyric acid, valine, norvaline, leucine, isoleucine, norleucine, α-amino heptanoic acid, 1-amino-2-methyl hexanoic acid, phenyl glycine, phenylalanine, O-methyl serine, O-acetyl serine, α-amino-ε-acetoxy hexanoic acid, methionine, N-carbobenzoxy ornithine, N-carbobenzoxy lysine, ω-methyl-, ω-ethyl-, ω-propyl-, ω-butyl-, and ω-benzyl glutamates and aspartates, and N-methyl-α alanine.

The last mentioned copolymers produced consist essentially of a number of at least one of the units within generic Formula A and a number of at least one of the units of the generic Formula B:

$$-\overset{O}{\overset{\|}{C}}-\overset{|}{\underset{|}{C}}-\overset{|}{N}$$

but other than the units within generic Formula A. Examples of some of the latter are:

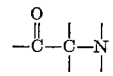

wherein Z is selected from the group consisting of hydrogen and a radical selected from the group of radicals consisting of phenyl, and Q—$CH_2$— radicals, with Q being selected from the group consisting of hydrogen, phenyl radicals, alkyl radicals straight or branched chain, of 1–4 carbon atoms, $CH_3O$—, $CH_3COO$—,
$CH_3COO(CH_2)_3$—, $CH_3SCH_2$—
$C_6H_5CH_2OOCNH(CH_2)_y$—, $R_1CH_2OOC(CH_2)_z$—
with $R_1$ being selected from the group consisting of hydrogen, and a radical selected from the group of radicals consisting of phenyl and alkyl radicals, straight or branched chain, or 1–3 carbon atoms, $y$ being 2 or 3 and $z$ being 0 or 1;

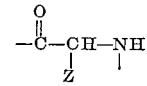

wherein $Z_1$ is selected from the group consisting of hydrogen and methyl;

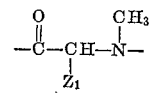

and

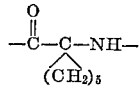

The condensation-polymerization and the condensation-copolymerization reactions are carried out by condensing, accompanied by the evolution of carbon dioxide gas, in an inert solvent, and preferably a non-protonic solvent, such as methylene chloride in dry state for example, and in the presence of a base catalyst, which is preferably a tertiary amine, such as tributylamine for example, a compound within generic Formula I, or a mixture of two or more compounds within generic Formula I but differing from each other by the number of carbon atoms therein, or a mixture of one or more of said compounds within generic Formula I and one or more of other N-carboxy anhydrides, with the mole ratio of the former to the latter being in the preferable ratio range of 100–5 to 5–100 depending on the characteristics desired in the co-polyamides.

In one of the more specific aspects of this invention, it is preferred that said units within said Formula A be present in said homopolymeric and copolymeric polyamides in at least such number that said polyamides are soluble in at least 0.1% (w./v.) concentration in said mineral spirits at 75° C. Said solubility is determined by the use of a strong volatile solvent, such as methylene chloride. Five grams of the polyamide is dissolved in 100 ml. of methylene chloride at 25° C. To this solution is added 5000 ml. of said mineral spirits at 25° C. Then the mass is nitrogen sparged up to 100° C. until all of the methylene chloride has been removed therefrom. The resulting mass is cooled to 75° C. and then examined. If there is no evidence that any of the polyamide has been thrown out of solution, it is considered soluble in the mineral spirits at 75° C. In another of the more specific aspects of this invention, it is preferred that said units within said Formula A be present in said polyamides in at least such number that the presence of only 1 gram thereof dissolved in said mineral spirits at least doubles the viscosity thereof at 25° C. as measured with a Brookfield Viscometer. In still another of the more specific aspects of this invention, it is preferred that the molecular weight of said polyamides be at least 5,000 and may be as high as 10,000,000 or more. The molecular weight of the polyamides produced may be controlled by varying the solvent, for example, using dimethylformamide and by varying the catalyst, for example, using a primary or secondary amine, such as n-hexyl amine or dibutyl amine and varying the concentration of the monomer in the solvent, the ratio of monomer to catalyst and/or the temperature at which the condensation occurs.

The novel N-carboxy anhydrides of this invention and within said generic Formula I are produced by, in an inert liquid medium, preferably a solvent for phosgene, reacting phosgene with the novel ω-alkyl esters of this invention described in our Patent No. 3,285,953, issued Nov. 15, 1966, and within the generic Formula II:

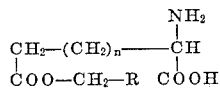

with R and $n$ being as before defined.

The aforesaid application is by reference in its entirety made part hereof and consequently shall be regarded as having been completely recited herein. As described in said patent, acid-addition salts of said esters are produced by, in the presence of a strong acid catalyst and at temperatures in the range of about 25°–100° C., reacting an acid addition salt of glutamic or aspartic acid with a primary alcohol (R—CH$_2$—OH) in a co-solvent for said alcohol and salt. The temperature preferred is in the range of about 40°–80° C. and optimumly in the range of about 60° C. to about 70° C.

The co-solvent for said salts and primary alcohol reactants is preferably one or more tertiary monohydric alkyl alcohols, such as t-butanol, t-hexanol and t-octanol and the acid catalyst is one which will not react with, will not cause dehydration of or otherwise decompose or adversely affect a significant or intolerable proportion of the tertiary alcohol co-solvent under the conditions of reaction employed.

The acid-addition salts preferably used are produced by combining with said esters an acid containing an SO$_3$H or an SO$_4$H moiety. Said acids are also preferably employed as said catalysts. Some examples of said acids are sulfuric acid, aromatic sulfonic acids, such as benzene sulfonic acid, naphthalene sulfonic acid, alkylaromatic sulfonic acids, such as paratoluene sulfonic acid, alkyl and cycloalkyl sulfonic acids, such as methyl, ethyl, propyl, butyl, cyclobutyl and cyclohexyl sulfonic acids, sulfated alcohols of 8–22 carbon atoms in which one mole of SO$_3$ of H$_2$SO$_4$ is reacted with 1 mole of the alcohol to form the acid sulfate thereof. The primary alcohol reactants are preferably of 8–22 carbon atoms; examples of some of them are octanol, decanol, dodecanol, tetradecanol, hexadecanol, octadecanol, eicosanol, 2 - ethylhexanol, isooctanol, tridecanol and mixtures of two or more of them.

After said acid-addition salts of said ω-alkyl esters are produced, they are neutralized to provide the free esters which are subsequently purified and are employed as reactants for the production of the novel N-carboxy anhydrides of this invention.

The following Examples I–VIII are illustrative of specific methods for producing some of said ω-alkyl esters, and are given for the purpose of illustration and not by way of limitation.

EXAMPLE 1

Preparation of ω-n-dodecyl-L-glutamate

|   |   | Grams | Moles | Ml. |
|---|---|---|---|---|
| (1) | L-glutamic acid | 220.5 | 1.5 | |
| (2) | t-Butyl alcohol | | | 1,500 |
| (3) | n-Dodecyl alcohol | 1,116 | 6.0 | |
| (4) | Sulfuric acid (98%) | | 2.25 | 120 |
| (5a) | Triethylamine | | | 120 |
| (5b) | do | | | 450 |

A 12-liter 3-neck flask equipped with stirrer, thermometer and addition funnel is charged with (1), (2), and (3). This mixture is stirred and heated to 40° C. and then (4) is added dropwise thereto through the funnel whereupon the temperature thereof increases to 50° C. At this stage the mass contains only about .75 moles of free sulfuric acid because all of (1) has reacted with about 2 moles of the sulfuric acid to convert (1) into the acid addition salt thereof. The temperature of the mass is then raised to and maintained 65° C. until said salt and (3) are dissolved in (2) and the mass becomes a clear solution. Then the solution is maintained at 65° C. for 1 hour to assure substantially complete reaction between said salt and (3) to produce in good yield a compound within the generic Formula II. The heat is then turned off and (5a) is added dropwise thereto as rapidly as possible to neutralize the free sulfuric acid therein. This is followed by the addition thereto of 375 ml. of water and then 5250 ml. of 95% ethanol. While still being stirred, (5b) is added thereto to neutralize said salt and convert it into its free ester. At this stage the temperature of the mass has dropped to 45° C. Stirring is continued for an additional half hour and the crude free glutamate which has precipitated out is filtered on a Buchner funnel. The recovered precipitate is slurried for 20 minutes at 65° C. with 4 liters of water and then filtered at 65° C. and a solid cake is recovered. The cake is washed with 1 liter of methanol, then with 1 liter of diethyl ether. Then it is dried at 50°C. in a vacuum oven for 3 hours and there is obtained crude ω-n-dodecyl-L-glutamate which weighs 253 grams (53.5% yield), M.P. 170°–177° C., which contains no glutamic acid by paper strip assay using a ninhydrin color test.

PURIFICATION

The crude product is recrystallized by adding 8000 ml. of hot 2:1 isopropanol: water solution and heating to 83° C. until complete solution takes place, and then cooling the solution to 25° C. at which temperature the glutamate has precipitated out. The mass is filtered on a Buchner funnel to separate out and recover the precipitate which is then displace washed with 500 ml. of 2:1 isopropanol:water solution. The precipitate is further washed with 1500 ml. of methanol and then with 1500 ml. of diethyl ether, and is then air dried on the funnel. The so purified product is vacuum dried at 25°–30° C. in a vacuum oven overnight to constant weight and there is obtained 229 grams (48.5%) yield of pure ω-n-dodecylglutamic crystals, known as Product I, M.P. 177°–177.4° C. Elemental analyses are:

Calculated (percent): C, 64.72; H, 10.54. Found (percent): C, 64.75; H, 10.39.

EXAMPLE II
Preparation of ω-n-tetradecyl-L-glutamate

|  |  | Grams | Moles | Ml. |
|---|---|---|---|---|
| (1) | L-glutamic acid | 220.5 | 1.5 |  |
| (2) | t-Butyl alcohol |  |  | 1,500 |
| (3) | n-Tetradecanol | 1,284 | 6.0 |  |
| (4) | Sulfuric acid (98%) | 221.5 | 2.25 |  |
| (5a) | Triethylamine |  |  | 105 |
| (5b) | do |  |  | 240 |

Using (1), (2), (3), (4), (5a), and (5b) of this example in place of those items of Example I, but otherwise repeating Example 1, through the first filtration step thereof, crude ω-n-tetradecyl-L-glutamate precipitate is recovered. The precipitate is washed with 2 liters of methanol, then with 2 liters of diethyl ether and then dried to constant weight in a vacuum oven at 25° C. The dried crude ester weighs 383 grams (74.5%) yield.

The crude ester is recrystallized from 9575 ml. of hot 1:1 butanol:water solution. Solution is effected at about 84° C. and then the solution is cooled at once to 30° C. whereupon the ester precipitates out. The mass is filtered through a coarse fritted glass Buchner funnel to separate and recover the precipitate. The precipitate is displace washed with 500 ml. of methanol, then with 500 ml. of diethyl ether and subsequently sucked dry, appearing in the form of white crystalline plates. These plates are dried to constant weight in a vacuum oven at 25°–30° C. The resultant dry pure ω-n-tetradecyl-L-glutamate product, known as Product II, weighs 272.9 grams (53.2% yield), M.P. 175°–176° C. Paper strip assay thereof for glutamic acid is negative. Elemental analyses thereof are:

Calculated (percent): C, 66.43; H, 10.86; N, 4.08; S, 0.0. Found (percent): C, 66.44; H, 10.82; N, 4.07; S, 0.0.

EXAMPLE III
Preparation of ω-n-hexadecyl-L-glutamate

|  |  | Grams | Moles | Ml. |
|---|---|---|---|---|
| (1) | L-glutamic acid | 14.7 | 0.1 |  |
| (2) | t-Butanol |  |  | 200 |
| (3) | n-Hexadecanol | 194.0 | 0.8 |  |
| (4) | Sulfuric acid (98%) |  | 0.15 | 8 |
| (5a) | Triethylamine |  |  | 7 |
| (5b) | do |  |  | 18 |

Using (1), (2), (3), and (4) of this example in place of those items of Example I, but otherwise repeating Example 1 through the step where the heat is turned off, (5a) is then added dropwise to the reaction mass. This is followed by the addition thereto of 50 ml. of water and then 350 ml. of 95% ethanol. The salt therein is neutralized with (5b) and crude ω-n-hexadecyl-L-glutamate precipitates out and is recovered by filtration at 35° C. The precipitate is washed with 100 ml. of methanol and then with 100 ml. of diethyl ether, then sucked dry and finally dried in a vacuum oven at 25°–30° C. The dry crude precipitate weighs 28.65 g. (yield: 77.6%).

PURIFICATION

One half (14.32 grams) of the dry crude precipitate is digested in a hot (80°–88° C.) mixture of 250 ml. of water and 100 ml. of isopropanol, then cooled to and filtered at 65° C. The recovered precipitate is washed with 50 ml. of cold water:isopropanol mixture, then with 50 ml. of methanol and finally with 50 ml. of diethyl ether. Then it is sucked dry and subsequently dried to constant weight in a vacuum oven at 25°–30° C., and there is obtained 11.2 grams (61% yield) of ω-n-hexadecyl-L-glutamate, melting at 172°–172.8° C., free of glutamic acid and known as Product III.

The other half (14.32 grams) of the crude precipitate is recrystallized from 350 ml. of 1:1 mixture of butanol and water by heating to 90° C., cooling to 30° C. and filtering. The recovered precipitate is washed with 50 ml. of 1:1 water:isopropanol, then with 50 ml. of methanol and finally with 50 ml. of diethyl ether. The washed precipitate is dried and there is obtained 10.7 grams (58.5% yield) of pure ω-n-hexadecyl-L-glutamate product, known as Product IIIa, melting at 174.5°–175.2° C. The paper strip assay thereof for glutamic acid is negative. Elemental analyses are:

Calculated (percent): C, 67.88; H, 11.12; N, 3.77; S, 0.0. Found (percent): C, 67.55; H, 11.17; N, 4.00; S, <0.2.

EXAMPLE IV
Preparation of ω-n-octadecyl-L-glutamate

|  |  | Grams | Moles | Ml. |
|---|---|---|---|---|
| (1) | Glutamic acid | 147 | 1.0 |  |
| (2) | t-Butanol |  |  | 2,000 |
| (3) | n-Octadecyl alcohol | 1,082 | 4.0 |  |
| (4) | Sulfuric acid (98%) |  | 1.5 | 80.0 |
| (5a) | Triethylamine |  | 0.5 | 70.0 |
| (5b) | do |  | 1.15 | 160.0 |

Using (1), (2), (3), (4), and (5a) of this example, in place of those items of Example I and otherwise repeating Example I up to and through the addition of (5a) therein, 250 ml. of water and 3500 ml. of 95% ethanol are added thereto and then (5b) is added, and the mass stirred for 30 minutes. The resultant mass, containing crude free ester precipitate therein, is filtered at 35° C. to recover the precipitate. The precipitate is slurried in 3 liters of hot methanol at 65° C., filtered on a coarse fritted glass Buchner funnel, displace washed with 1000 ml. of diethyl ether and dried to constant weight in a vacuum oven at 25°–30° C. The crude product, ω-n-octadecyl-L-glutamate, weighs 238 grams (59.5% yield) and melts at 168°–178° C.

PURIFICATION

The crude glutamate is recrystallized with hot (80° C.) 1:1 n-butanol:water mixture by heating same therein, with stirring, to 92° C., and after complete solution cooling to 25° C. and filtering. Then it is washed with 500 ml. of methanol, 500 ml. of diethyl ether, and finally dried to constant weight in a vacuum oven at 25°–30° C. The resulting product, 183.5 grams (46% yield) of pure ω-n-octadecyl-L-glutamate, is known as Product IV. Paper strip assay thereof for glutamic acid is negative. Elemental analyses are:

Calculated (percent): C, 69.13; H, 11.35; N, 3.51; S, 0.0. Found (percent): C, 69.16; H, 11.20; N, 3.58; S, 0.0.

EXAMPLE V
Preparation of ω-n-eicosyl-L-glutamate

|  |  | Grams | Moles | Ml. |
|---|---|---|---|---|
| (1) | L-glutamic acid | 38.6 | 0.26 |  |
| (2) | t-Butanol |  |  | 525 |
| (3) | n-Eicosyl alcohol | 314.0 | 1.0 |  |
| (4) | Sulfuric acid (98%) |  | 0.28 | 21.0 |
| (5a) | Triethylamine |  | 0.13 | 18.3 |
| (5b) | do |  | 0.59 | 81.5 |

Using (1), (2), (3), (4), and (5a) of this example in place of those items of Example I, and otherwise repeating Example I up to and including the step of adding (5a) therein, 65 ml. of water and 920 ml. of 95% ethanol are added to said mass. This is followed by the addition of (5b) to said mass after which the temperature thereof is raised to 65° C. The mass is stirred for one-half hour and filtered hot through a preheated coarse funnel to recover a filter cake of crude ω-n-eicosyl-L-glutamate. The cake is washed with 1050 ml. of hot methanol and then with 1050 ml. of diethyl ether. To remove unreacted glutamic acid therefrom, it is slurried in water at 85° C., filtered and washed again with methanol and diethyl ether and dried. 38 grams of the crude ester are obtained.

The crude ester is recrystallized with 950 ml. of 1:1 butanol:water by heating to 94° C. to effect solution, cooling to 25° C., filtering, washing the filter cake with 250 ml. of methanol and then with 250 ml. of diethyl ether and finally drying in a vacuum oven. The dry purified ester is pure ω-n-eicosyl-L-glutamate, melting at 174°–175° C., known as Product V. Paper strip assay thereof for glutamic acid is negative. Elemental analyses are:

Calculated (percent): C, 70.19; H, 11.55. Found (percent): C, 70.19; H, 11.35.

EXAMPLE VI

Preparation of ω-n-octyl-L-glutamate

|      |                   | Grams | Moles | Ml.  |
|------|-------------------|-------|-------|------|
| (1)  | L-glutamic acid   | 220.5 | 1.5   |      |
| (2)  | t-Butyl alcohol   |       |       | 1,500|
| (3)  | n-Octyl alcohol   | 780   | 6.0   |      |
| (4)  | Sulfuric acid (98%)|      | 2.25  | 120  |
| (5a) | Triethylamine     |       |       | 120  |
| (5b) | do                |       |       | 450  |

Using (1), (2), (3), (4), and (5a) of this example in place of those items of Example I, and otherwise repeating Example I through the step of the (5a) addition, to the mass is added a mixture of 350 ml. of water and 5000 ml. of 95% methanol. The acid-addition salt of the ω-n-octyl-L-glutamate therein is neutralized by the addition of (5b) whereupon the crude free glutamate precipitates out. The mass is filtered to separate the precipitate, which is then re-suspended in 4 liters of water at 65° C. for 20 minutes and subsequently separated therefrom by filtration. The precipitate is washed with 1 liter of methanol and then with 1 liter of diethyl ether to remove occluded impurities, mainly dioctyl glutamate. The crude precipitate is oven dried, and in that condition weighs 214 grams (55% yield). This crude ω-n-octyl-L-glutamate product has a melting point of 182.4°–184° C. and, when subjected to a paper strip assay through a ninhydrin color development, shows no glutamic acid.

PURIFICATION

The crude product is recrystallized by adding thereto 3 liters of 1:1 isopropanol-water solvent and heating the mass to 83° C., whereupon complete solution occurs. Immediately thereafter, the solution is cooled to 25° C., at which temperature the ester precipitates out in crystalline form. The mass is filtered through a Buchner funnel to separate the ester which is then washed with 300 ml. of cold 1:1 isopropanol:water, then with 1 liter of methanol and finally with 1 liter of diethyl ether. The ester is dried to constant weight in a vacuum oven at 30°–35° C., whereby there is obtained 195 grams (50% yield) of pure ω-n-octyl-L-glutamate, known as Product VI, melting at 184.5°–185° C. and having elemental C, H, and N analyses that agreed with theoretically calculated values.

EXAMPLE VII

Preparation of ω-n-octadecyl-L-aspartate

|      |                    | Grams | Moles | Ml.  |
|------|--------------------|-------|-------|------|
| (1)  | L-aspartic acid    | 133.1 | 1.0   |      |
| (2)  | t-Butyl alcohol    |       |       | 2,000|
| (3)  | n-Octadecyl alcohol| 1,082 |       |      |
| (4)  | Sulfuric acid (98%)|       | 1.5   | 80   |
| (5a) | Triethylamine      | 0.5   |       | 70   |
| (5b) | do                 | 1.15  |       | 160  |

Using (1), (3), (4) and (5a) of this example in place of those items of Example I and otherwise repeating Example I through the step of the (5a) addition, to this mass is added a mixture of 50 ml. of water and 3500 ml. of 95% methanol and then (5b), whereupon the acid sulfate salt of ω-n-octadecyl-L-aspartate therein becomes converted to the free aspartate which precipitates out. The suspension is stirred for 30 minutes and filtered at 35° C. to separate the crude ω-n-octadecyl aspartate product. The product is resuspended in 3 liters of hot methanol at 65° C., filtered, washed with 1 liter of diethyl ether, and finally oven dried to constant weight to yield 230 grams of crude ω-n-octadecyl-L-aspartate product weighing 230 grams.

PURIFICATION

The crude product is recrystallized from 1:1 butanol-water mixture with stirring and heating to over 90° C. for complete solution and then cooled to 25° C. for crystallization. Removing crystalline product therefrom by filtration, washing successively with 500 ml. of methanol and 500 ml. of diethyl ether and finally drying to constant weight at 25°–30° C. under vacuum, yields 180 grams (47%) of pure ω-n-octadecyl-L-aspartate, known as Product VII, and free of aspartic acid by paper strip chromatography.

EXAMPLE VIII

Preparation of ω-n-decyl-L-glutamate

Using the same procedure and same items as those of Example I, except substituting 948 grams (6 moles) of n-decyl alcohol for item 3 thereof, yields pure ω-n-decyl-L-glutamate crystals, known as Product VIII and melting at 176.5–177° C.

The following are examples of some of the novel N-carboxy anhydrides, polyamides produced therewith and compositions in which said polyamides are components thereof, all being given by way of illustration and not by limitation:

Preparation of novel N-carboxy anhydrides

In each of the following Examples IA to VIIIA, there is employed a 1 or 2 liter glass flask depending upon the capacity required. The flask is equipped with stirrer, thermometer, addition funnel and drying tube. The ester is first charged into the flask and then dioxane is added thereto and with stirring a suspension $a$ is produced. In a separate vessel phosgene is dissolved in dioxane to provide a solution $b$. The reactions between the phosgene and esters are all conducted under anhydrous conditions and constant stirring. The dioxane employed is pure, dry dioxane. The hexane employed is dry and purified by distillation over calcium hydride.

EXAMPLE I-A

Preparation of ω-n-dodecyl-L-glutamate-N-carboxy anhydride

|      |                                              | Grams  | Moles |
|------|----------------------------------------------|--------|-------|
| (a)  | ω-n-Dodecyl-L-glutamate [Product I]          | 101.6  | 0.32  |
|      | Dioxane                                      | 1,100.0|       |
| (b)  | Phosgene                                     | 39.6   | 0.40  |
|      | Dioxane                                      | 180.0  |       |

Solution $b$ is added to suspension $a$ over a 45-minute period while the mass is maintained at 50° C. The mass is maintained at 50° C. for 35 minutes more, whereupon the last traces of dodecyl-L-glutamate go into solution. The solution is purged with dry nitrogen for 50 minutes, filtered, stripped of solvent, and last traces removed at 35° C. bath temperature at 0.1 mm. of mercury pressure. There is obtained 132 g. of crude white solid reaction product which is recrystallized four times with 350 g. each of dry hexane at 0° C. An 88.0 gram (80.3%) yield of pure ω-n-dodecyl-L-glutamate anhydride, known as Product I-A, and being a white solid melting at 53°–54.5° C. is obtained. A 2.0 gram sample tested for hydrolysable chlorine shows only 0.01% chlorine.

EXAMPLE II-A

ω-n-Tetradecyl-L-glutamate-N-carboxy anhydride

|      |                                              | Grams  | Moles |
|------|----------------------------------------------|--------|-------|
| (a)  | ω-n-Tetradecyl-L-glutamate [Product II]      | 93.0   | 0.25  |
|      | Dioxane, dry                                 | 1,250.0|       |
| (b)  | Phosgene                                     | 30.0   | 0.30  |
|      | Dioxane                                      | 125.0  |       |

Solution $b$ is added to suspension $a$ over a 65-minute period while the mass is maintained at 50° C. The mass is maintained for 40 minutes more at 50° C., whereupon all the solids have reacted, and the clear solution is held at this temperature for an additional 20 minutes. The reaction mass is nitrogen sparged at 50° C. for 30 minutes and then at 25° C. for 20 minutes. The mass is filtered to remove the last traces of dioxane, whereby crude anhydride is obtained. Filtration removes the last traces of dioxane, whereby crude anhydride is obtained. Filtration removes dirt particles, and vacuum distillation is used to remove last traces of dioxane. The crude product is recrystallized four times from 300 ml. portions of dry hexane by warming to 50° C. and cooling to 25° C. whereby the pure anhydride is obtained in the form of white crystals, known as Product II–A melting at 59.5°–61° C., 93% yield (92.4 grams). A sample is analyzed for the elements shown:

Calculated (percent): C, 65.01; H, 9.55; N, 3.79. Found (percent): C, 65.36; H, 9.63; N, 4.01.

A 2.0 gram sample is hydrolyzed by boiling in 15 ml. of dioxane, 35 ml. methanol, and 150 ml. of water, upon potentiometric titration in dilute nitric acid with standard silver nitrate, showing only 0.01% chlorine.

EXAMPLE III–A

Preparation of ω-n-hexadecyl-L-glutamate-N-carboxy anhydride

|     |                                          | Grams | Moles |
|-----|------------------------------------------|-------|-------|
| (a) | ω-n-Hexadecyl-L-glutamate [Product III]  | 18.3  | 0.05  |
|     | Dioxane                                  | 150.0 |       |
| (b) | Phosgene                                 | 6.0   | 0.06  |
|     | Dioxane                                  | 25.0  |       |

Solution $a$ is added to suspension $b$ over a 50-minute period while the mass is maintained at 50° C. The mass is maintained at 50° C. for 100 minutes whereupon the last traces of solids are dissolved. The reaction mass is blown with nitrogen for 45 minutes, filtered, stripped of dioxane and last traces of volatiles are removed at 35° C. temperature bath and 0.1 mm. of mercury pressure. A yield of 20.2 grams of crude anhydride, melting at 69°–70° C. is obtained. It is recrystallized twice, using 136 grams and then 100 grams of dry hexane. Solution is achieved at 50°–55° C. followed by cooling to 25° C. for crystallization. There is obtained 19.09 grams (95% yield) of pure anhydride in the form of a white crystalline product, known as Product III–A, melting at 69.5°–70.5° C. Elemental analyses are:

Calculated (percent): C, 66.46; H, 9.89; N, 3.59. Found (percent): C, 66.20; H, 9.89; N, 3.52.

A 2.0 gram sample hydrolyzed and subjected to a micropotentiometric titration indicated no detectable chlorine.

EXAMPLE IV–A

Preparation of ω-n-octadecyl-L-glutamate-N-carboxy anhydride

|     |                                                      | Grams | Moles |
|-----|------------------------------------------------------|-------|-------|
| (a) | ω-n-Octadecyl-L-glumate [Product IV] (60 mesh)       | 20.0  | 0.05  |
|     | Dioxane                                              | 150.0 |       |
| (b) | Phosgene                                             | 6.0   | 0.06  |
|     | Dioxane                                              | 25.0  |       |

Solution $b$ is added to suspension $a$ at a pot temperature of 50° C. over a 50-minute period. The mass is maintained at 50° C. for 2 hours whereupon a clear solution is effected. The solution is sparged for 15 minutes with nitrogen at 50° C., then for 45 minutes, followed by slow cooling to 25° C. It is then filtered, stripped of dioxane and dried under vacuum at 30°–35° C. A 22.4 gram yield of crude anhydride is so obtained, after which it is recrystallized four times out of 100 gram portions of dry hexane by warming to dissolve and cooling to 25° C. There is obtained 20.7 g. (97% yield) of pure anhydride, known as Product IV–A, in the form of a white crystalline product that melts at 77°–78° C. A sample analyzed as shown below agrees very closely with theoretical values:

Calculated for $C_{24}H_{43}O_5N$ (percent): C, 67.73; H, 10.18; N, 3.29. Found (percent): C, 67.74; H, 10.22; N, 3.45.

Hydrolyzable chlorine on a 2.0 gram sample shows only 0.04% chlorine.

EXAMPLE V–A

Preparation of ω-n-eicosyl-L-glutamate-N-carboxy anhydride

|     |                                         | Grams | Moles |
|-----|-----------------------------------------|-------|-------|
| (a) | ω-n-Eicosyl-L-glutamate [product V]     |       | 0.05  |
|     | Dioxane                                 | 150   |       |
| (b) | Phosgene                                | 6.0   | 0.06  |
|     | Dioxane                                 | 25.0  |       |

Solution $b$ is added to suspension $a$ at a pot temperature of 50° C. over a 1-hour period. The mass is maintained at 50° C. until a clear solution mass is effected, after which it is sparged with nitrogen for 30 minutes at 50° C. and then for 1 hour, followed by cooling to 25° C. The mixture is filtered, stripped of dioxane and dried under high vacuo at 30–35° C. The crude product is recrystallized 6 times from dry hexane to yield pure anhydride, known as product V–A, in crystalline form.

EXAMPLE VI–A

Preparation of ω n-octyl-L-glutamate-N-carboxy anhydride

|     |                                       | Grams | Moles |
|-----|---------------------------------------|-------|-------|
| (a) | ω-n-Octyl-L-glutamate [Product VI]    | 25.9  | 0.1   |
|     | Dioxane, pure, dry                    | 320   |       |
| (b) | Phosgene                              | 14.85 | 0.15  |
|     | Dioxane                               | 50    |       |

Solution $b$ is added to suspension $a$ over a 15-minute period while holding the temperature of the mass at 50° C. The resultant mass is maintained at 50° C. for an hour, and is then blown for 30 minutes at 50° C. with dry nitrogen to sweep out hydrogen chloride by-product and excess phosgene. Then it is cooled to 25° C., blown an additional hour at 25° C. and subsequently stripped of solvent by vacuum distillation. Last traces of dioxane are removed by heating at 30°–35° C., 0.1 mm. of mercury pressure, for 30 minutes. The crude product is a pale yellow liquid weighing 28.9 grams. The crude product is recrystallized once from petroleum ether at 30° C., yielding pure ω-n-octyl-L-glutamate - N - carboxy anhydride, known as Product VI–A, melting at 21°–23° C. and having the following analyses:

Calculated (percent): C, 58.94; H, 8.13. Found (percent): C, 58.72; H, 8.07.

The product is stored at −78° C. to prevent decomposition.

EXAMPLE VII–A

Preparation of ω-n-octadecyl-L-aspartate-N-carboxy anhydride 0.05 gram mole of ω-n-octadecyl-L-aspartate (Product VII) is substituted for the glutamate of Example IV–A while otherwise repeating Example IV–A, thereby producing the N-carboxy anhydride of said aspartate, known as Product VII–A.

EXAMPLE VIII–A

Preparation of ω-n-decyl-L-glutamate-N-carboxy anhydride

|     |                                        | Grams | Miles |
|-----|----------------------------------------|-------|-------|
| (a) | ω-n-Decyl-L-glutamate [product VIII]   | 28.7  | 0.1   |
|     | Dioxane                                | 325.0 |       |
| (b) | Phosgene                               | 10.89 | .11   |
|     | Dioxane                                | 50.0  |       |

Solution $b$ is slowly added over a 105-minute period to suspension $a$ while the mass is maintained at 50° C. The resultant mass is maintained at 50° C. for 35 minutes more and is then subjected to nitrogen sparging over a 90-minute period, while being slowly cooled to 25° C. to sweep out excess phosgene and hydrogen chloride reaction by-product. Then the last traces of dioxane are stripped completely from said mass in a rotating evaporator, yielding 34.65 grams of crude ω-n-decyl-L-glutamate-N-carboxy anhydride product melting at 35°–38°

C. After recrystallization twice from petroleum ether, there is obtained 23.0 grams (73.5% yield pure ω-decyl-L-glutamate-N-carboxy anhydride with a chlorine content of less than 0.2%. This pure product is a white solid, M.P. 36°–38° C., known as Product VIII–A. It is soluble at 0° C. in chloroform, carbon tetrachloride, tetrahydrofuran, ethyl acetate, acetone, and slightly soluble in diisopropyl ether at 0° C. It is insoluble at 0° C. in cyclohexane and petroleum ether.

Preparation of novel polyamides

In each of the folowing Examples P–1 to P–12 on, there is employed a dry Erlenmeyer flask equipped with a magnetic stirrer and drying tube. The anhydride to be condensed is first charged into the flask and then the inert solvent, methylene chloride, is added thereto to dissolve the anhydride and then the catalyst, tributylamine, is added to the solution, preferably while in methylene chloride. After these components provide a clear solution, agitation is stopped and condensation and polymerization are permitted to proceed for a period depending upon the molecular weight of the polypeptide desired. The addition of the components into the flask and the condensation and polymerization are preferably conducted under a dry nitrogen blanket. Then the polypeptide is thrown out of solution, purified, and dried. The methylene chloride used is pure and dry and is freshly distilled off sodium hydroxide pellets; the tributylamine used is previously purified by fractional distillation and stored in evacuated tubes.

EXAMPLE P–1

Preparation of poly-ω-n-dodecyl-L-glutamate

| | Grams |
|---|---|
| ω-n-Dodecyl-L-glutamate - N - carboxy anhydride (Product I–A) | 85.0 |
| Methylene chloride | 2125.0 |
| Tributylamine (in 100 grams of methylene chloride) | 1.7 |

The solution of the aforesaid components is permitted to remain at 25° C. for 72 hours achieving high yields of polypeptide of molecular weight in excess of 50,000. The resultant mass, which is essentially a solution of the polypeptide, is poured into 6000 ml. of acetone whereupon the polypeptide is thrown out of solution. The mass is stirred and then filtered to separate the crude polypeptide therefrom. The crude polypeptide is washed with acetone and dried, whereby there is obtained 65.23 grams (82% yield) of crude product whose reduced viscosity in 1:1 (volume) t-butanol-xylene, 0.5% concentration is 24.7. Then 65.2 grams of said crude product are re-dissolved in 500 ml. of methylene chloride and reprecipitated by pouring the solution into 1500 ml. of acetone. The mass is filtered whereby the polypeptide is separated and recovered in the form of a soft, waxy product, known as Product P–1, weighing 58 grams. A 0.5% solution thereof in 1:1 (volume) t-butanol-xylene has a reduced viscosity of 43.5. In order to eliminate intermolecular hydrogen bonding effects, the soft, waxy polypeptide is dissolved in 1:4 (volume) dichloroacetic acid-xylene to provide a 0.5% solution. This has a reduced viscosity of 2.28, equivalent to a molecular weight of 128,000.

EXAMPLE P–2

Preparation of poly-ω-n-tetradecyl-L-glutamate

| | Grams |
|---|---|
| ω - n-Tetradecyl-L-glutamate-N-carboxy anhydride (Product II–A) | 87.0 |
| Methylene chloride | 2225.0 |
| Tributylamine (in 100 grams of methylene chloride) | 1.3 |

The solution of the aforesaid components is permitted to remain at 25° C. under dry nitrogen for 72 hours. At the end of the first 24 hours a sample is analyzed, showing no red absorption peaks at 5.42 and 5.64 micron wave lengths, those of the anhydride reactant, indicating condensation of all of the monomer. At the end of the 72 hours the resultant mass, which is essentially a solution of the polypeptide is poured into 6000 ml. of acetone with stirring, whereupon the polypeptide in the form of flocculent particles is thrown out of solution. It is then filtered to separate the crude polypeptide therefrom. The crude polypeptide is washed with acetone, and dried, whereby there is obtained 66.2 grams (81.8% yield) of crude product. A 0.5% solution thereof in 1:1 (volume) t-butanol-xylene has a reduced viscosity of 12.7. The crude product is then redissolved in 500 ml. of methylene chloride and re-precipitated in 2000 ml. of acetone with stirring. The mass is filtered to separate out and recover the polypeptide, which is washed with acetone and dried, whereby there is recovered a white polypeptide in 87% yield known as Product P–2. A 0.5% solution thereof in 1:4 (volume) dichloroacetic acid-xylene has a reduced viscosity of 2.46. This indicates a molecular weight of 131,000.

EXAMPLE P–3

Preparation of poly-ω-n-hexadecyl-L-glutamate

| | Grams |
|---|---|
| ω-n-Hexadecyl - L - glutamate-N-carboxy anhydride (Product III–A) | 4.0 |
| Methylene chloride | 80.0 |
| Tributylamine, 1% concentration in methylene chloride | 8.0 |

The solution of the aforesaid components is made under a nitrogen blanket and while thereunder is permitted to remain at 25° C. for 24 hours. The resultant mass, which is essentially a solution of polypeptide of the anhydride, is poured into 300 ml. of acetone, whereupon the polypeptide is thrown out of solution as a white solid. The mass is stirred and then filtered to separate the polypeptide therefrom. The polypeptide is washed with acetone and dried, whereby there is obtained 3.0 grams (85.5%) yield of polypeptide, known as Product P–3, having a melting point of 64°–68° C. A 0.5% solution in dichloroacetic acid has a reduced viscosity of 0.064, indicating a molecular weight of 10,000–11,000. A check on the molecular weight on a "Vapor Phase Osmometer" shows the molecular weight thereof to be 10,600.

EXAMPLE P–4

Preparation of poly-ω-n-octadecyl-L-glutamate

| | Grams |
|---|---|
| ω-n - Octadecyl-L-glutamate-N-carboxy anhydride (Product IV–A) | 90.0 |
| Methylene chloride | 1550.0 |
| Tributylamine, 1% concentration in methylene chloride | 80.0 |

The solution of the aforesaid components is permitted to remain at 25° C. for 24 hours, at the end of which no unreacted anhydride is present as shown by the absence of 5.44 and 5.65 micron absorption peaks on the infrared spectrometer. The resultant mass, which is essentially a solution of the polypeptide, is poured into 4000 ml. of acetone, whereupon the polypeptide is thrown out of solution in the form of white fibrous solid particles. The mass is then filtered to separate the crude polypeptide therefrom. The polypeptide is dried and is in the form of a white, fibrous, flocculent solid which has a high electrostatic charge and is known as Product P–4, weighing 68.8 grams (85% yield). A 0.5% solution thereof in 1:1 butanol-xylene (volume) has a reduced viscosity of 7.66. The crude product is re-dissolved in 600 ml. of methylene chloride and reprecipitated by pouring the solution into 2400 ml. of acetone with stirring. The mass is filtered, whereby the polypeptide separates and is recovered, weighing 46.6 grams (68% yield). A 0.5% solution thereof in 1:1 (volume) t-butanol-xylene has a reduced viscosity of 11.8. A 0.5% solution thereof in 1:4 (volume) dichloroacetic acid-xylene has a reduced viscosity of 1.81 which indicates a molecular weight of 118,000.

EXAMPLE P-5

Preparation of poly-ω-n-eicosyl-L-glutamate

Substituting 85 parts of ω-n-eicosyl-L-glutamate (Product V-A) for the glutamate of Example P-4 and otherwise repeating Example P-4, there is produced a polypeptide having a molecular weight in excess of 50,000.

EXAMPLE P-6

Preparattion of poly-ω-n-octyl-L-glutamate

|  | Grams |
|---|---|
| ω-n-Octyl-L-glutamate-N-carboxy anhydride (Product VI-A) | 3.15 |
| Methylene chloride | 30.0 |
| Tributylamine, 1% concentration in methylene chloride | 6.3 |

The solution of the aforesaid components is permitted to remain at 25° C. for 48 hours. At the end of the first 4 hours the solution thickens considerably. At the end of the 48 hours the resultant mass, which is essentially a solution of the polypeptide, is poured into a mix of 150 ml. of acetone and 10 ml. of water, whereupon the polypeptide is thrown out of solution in the form of white particles. The mass is then filtered to separate the polypeptide therefrom and is washed with acetone-water. It then changes slowly from white particles to a fused semi-solid mass having a slightly yellowish tingle. The polypeptide weighs 2.40 grams (86.5% yield). A small sample thereof when heated remains rubbery at temperatures up to 270° C., and above 270° C. starts to turn brown slowly. A 1% solution of the polypeptide in toluene has a viscosity of 7180 centipoises at 25° C. on the "Brookfield Viscosimeter." This polypeptide can be dissolved in appreciable amounts in less active solvents at elevated temperatures but by using a more active solvent, such as methylene chloride, it could be transferred easily at room temperature to other less active solvents, such as corn oil, mineral oil, "Varsol 1" and isopropyl myristate which forms clear thick liquids or solid solutions, after all the methylene chloride is removed by distillation, depending upon the proportion of the residual solvent.

EXAMPLE P-7

Preparation of poly-ω-n-octadecyl-L-aspartate

Substituting 100 grams of ω-n-octadecyl-L-aspartate-N-carboxy anhydride (Product VII-A) for Product IV-A of Example P-4 and otherwise repeating Example P-4, there is produced a polypeptide having a molecular weight in excess of 50,000.

EXAMPLE P-8

Preparation of poly-ω-n-decyl-L-glutamate

|  | Grams |
|---|---|
| ω-n-Decyl-L-glutamate-N-carboxy anyhdride (Product VIII-A) | 3.0 |
| Methylene chloride | 21.0 |
| Tributylamine, 1% concentration in methylene chloride | 6.0 |

The solution of the aforesaid components is permitted to remain at 25° C. for 72 hours without agitation. The resultant mass, which is essentially a solution of the polypeptide, is poured into 160 ml. of methanol containing 10 ml. of water, with stirring, whereupon the polypeptide is thrown out of solution in the form of white flocculent particles. The mass is then filtered to separate the crude polypeptide therefrom. The crude polypeptide is washed with 15:1 (volume) methanol:water and dried, whereby there is obtained 2.05 grams (79.5%) yield of crude product. A 0.5% solution thereof in 1:1 (volume) t-butanol-xylene has a reduced viscosity of 4.8. Said crude product is re-dissolved in methylene chloride and re-precipitated by pouring the solution into acetone. The mass is filtered, whereby the polypeptide is separated out and recovered. The polypeptide is then dried, and is known as Product P-8. A 0.5 solution thereof in 1:1 t-butanol-xylene (volume) has a reduced viscosity of 5.08. A 0.2% solution thereof in dichloroacetic acid has a reduced viscosity of 0.38. The molecular weight, estimated, is 62,000.

Using the foregoing procedure and components except that the quantity of tributylamine used is only one-quarter that previously set forth, there is obtained a polypeptide of much higher molecular weight. A 0.2% solution thereof in dichloroacetic acid has a reduced viscosity of 0.69; estimated molecular weight 105,000.

The polypeptides produced in Examples P-1 to P-8 are all characterized by being homopolyamides, which consist essentially of a recurring unit within the generic Formula A, with R of Products P-1 to P-6 and P-8 being respectively of 11, 13, 15, 17, 19, 7 and 9 carbon atoms and $n$ being 1, and with R of Product P-7 being of 17 carbon atoms and $n$ being 0.

EXAMPLES P-9 AND P-10

Preparation of copolymer of mixtures (IV-A)-ω-n-octadecyl-L-glutamate-N-carboxy anhydride and (X)-ω-methyl-L-glutamate-N-carboxy anhydride Solutions of mixtures of (IV-A) and (X) are made by dissolving 2.0 grams thereof in 100 grams of a 1:6 (weight) dioxane-methylene chloride solvent. This solution is catalyzed by the addition of 8 ml. of a 1% solution of tributylamine in methylene chloride. The solution is then permitted to remain at 25° C. for 18 hours whereupon the reaction is complete, as evidenced by the fact that no N-carboxy anhydride is detected by the infrared spectroscope. The solution, consisting essentially of of copolymeric polypeptides of the esters, is poured into separate vessels, each containing 300 ml. of acetone, whereupon the copolymers are thrown out of solution. The masses are respectively filtered to separate out and recover the copolymers, each of which is washed with 100 ml. of acetone whereby copolymers, known as Products P-9 and P-10 are obtained. The following table shows the amounts of reactants, yields, and certain characteristics of Products P-9 and P-10.

| Product | Reactants, grams | | Copolymer yield, grams | Reduced[1] viscosity | Estimated molecular wt. | No. percent, unit— | | Average length of side chain |
|---|---|---|---|---|---|---|---|---|
|  | IV-A | X |  |  |  | C-1 | C-2 |  |
| P-9 | 1.6 | 0.4 | 1.45 | 0.885 | 82,000 | 64 | 36 | 11.86 |
| P-10 | 1.2 | 0.8 | 1.20 | 0.965 | 87,000 | 40 | 60 | 7.80 |

[1] The reduced viscosity is taken on a 0.2% solution thereof in 4:1 (volume) xylene-dichloroacetic acid. Units C-1 are of the generic Formula A, but with $n$ being 1 and the R of each of said units being of 17 carbon atoms; and units C-2 are of the formula

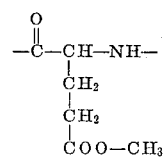

Each of said copolymeric Products P-9 and P-10 is soluble in 1% concentration in corn oil, lubricating oil SAE 20, xylene and said mineral spirits at 75° C. Solution is effected by first dissolving the copolymeric product in methylene chloride and this solution is then added to each of said liquids in amount to provide a 1% (w./v.) concentration of the copolymer therein. Then the methylene chloride is removed by using heat, vacuum and stirring and finally nitrogen sparging, and the small amounts of said liquids lost in the process are replaced to adjust to a 1% concentration. Said liquids containing said copolymeric materials are thickened thereby as evidenced by their viscosities being many times greater than the corresponding characteristics of the original liquids at 25° C.

EXAMPLE P–11

Preparation of copolymer of ω-n-octadecyl-L-glutamate-N-carboxy anhydride and ω-n-tetradecyl-L-glutamate-N-carboxy anhydride

|  | Grams |
|---|---|
| ω-n-Octadecyl-L-glutamate-N-carboxy anhydride (Product IV–A) | 2.5 |
| ω-n-Tetradecyl-L-glutamate-N-carboxy anhydride (Product II–A) | 2.5 |
| Methylene chloride | 95.0 |
| Tributylamine, 1% concentration in methylene chloride | 5.0 |

The two anhydrides were weighed in a nitrogen-filled glass flask and dissolved in the methylene chloride solvent. Then the tributylamine solution is added to the clear solution of the anhydrides with swirling. A drying tube is placed in the flask and the mass is held at room temperature for 96 hours for complete reaction as evidenced by no anhydride indication by infrared spectroscopy. This mass is permitted to remain at room temperature for an additional 24 hours and is then added slowly to 300 ml. of acetone with stirring, whereupon the copolymeric polypeptide is thrown out of solution in the form of white particles. The mass is filtered to separate out and recover the polypeptide, which is washed with acetone and then dried, yielding 3.75 grams (83.5% yield) of Product P–11. A 0.5% solution thereof in 1:5 (volume) dichloroacetic acid-xylene has a reduced viscosity of 2.28, indicating a molecular weight of 123,000.

EXAMPLES P–12—ON

One or a combination of two or more of the N-carboxy anhydrides of Formula I are condensed either with or without one or a combination of two or more of the other N-carboxy anhydrides recited herein. Using as a catalyst either tributylamine or other tertiary amine, a primary or secondary amine, water, sodium methylate, an alkali or other base catalyst, and varying the temperture of condensation and the concentration of the catalyst in the reactants, there are produced literally thousands of homopolymeric and copolymeric polyamines or polypeptides, all within the scope of the present invention.

The following examples illustrate the effectiveness of the novel polyamides of this invention, and illustrate various novel compositions of this invention in which one or more of said polyamides may be emplyed as components thereof.

Preparation of other thickened products

EXAMPLE T–1

Preparation of corn oil gel

Poly-ω-n-dodecyl-L-glutamate, molecular weight 128,000 (Product P–1) is dissolved in methylene chloride to make up a 1% (w./v.) solution thereof. A 10 ml. portion of said solution is mixed with 10 ml. of corn oil. The mix is blown with nitrogen while being warmed on a steam bath up to 95° C. to strip off all of the methylene chloride and is then cooled to 25° C. The resultant mass is a thick syrup consisting of a solution of said polymer in corn oil, in concentration of 1% (w./v.).

EXAMPLE T–2

Preparation of a corn oil gel

Poly-ω-n-octadecyl-L-glutamate, molecular weight of 118,000 (Product P–4) is first dissolved in methylene chloride to make up a 1% (w./v.) solution thereof. A 10 ml. portion of said solution is mixed with 10 ml. of corn oil. The mix is blown with nitrogen while being warmed to about 95° C. on a steam bath until all of the methylene chloride is stripped out. Then the mass is cooled to 25° C. at which temperature it is a gel.

EXAMPLE T–3

Preparation of a corn oil gel

Substituting poly-ω-n-octyl-L-glutamate (Product P–6) for Product P–4 and otherwise repeating Example T–2, there is obtained a corn oil gel.

EXAMPLE T–4

Preparation of corn oil margarine

|  | Grams |
|---|---|
| Poly - ω - n - octadecyl - L - glutamate, molecular weight 118,000 (Product P–4) | 4.0 |
| Methylene chloride | 156.0 |
| Corn oil | 196.0 |

The polymer is dissolved in the methylene chloride by shaking. The corn oil is then added to said solution with stirring, after which the methylene chloride is stripped out by blowing with nitrogen while the mass is heated on a steam bath up to 95° C. The resultant mass is a hot syrupy solution of the polymer in the corn oil (2% concentration). To this hot solution is added:

|  | Grams |
|---|---|
| Sorbitan trioleate (Span 85, Atlas) | 8.0 |
| Polyoxyethylene (20) sorbitan trioleate (Tween 80) | 8.0 |
| Water | 24.0 |

The mix is stirred while in the temperature range of 80°–90° C. to a creamy consistency. Then it is passed twice through a hand homogenizer's small orifice under pressure into an aluminum mold which is set in ice for quick chilling. The resultant product is a molded composition in the form of 1½″ x 1½″ x 5½″ slab. This composition is similar in appearance and spreadability to a commercially available margarine product made by the hydrogenation of corn oil.

A similar margarine is produced by using as the thickening agent 4 grams of poly-ω-n-octadecyl-L-glutamate having a molecular weight of only 36,000.

EXAMPLES T–5 TO T–7

Preparation of ashless greases 3 grams of poly-ω-n-octadecyl-L-gluatamate (Product P–4) as dissolved in 97 grams of methylene chloride to make up a 3% solution.

(a) 10 grams of said solution are mixed with 10 grams of SAE 20 motor oil.
(b) 20 grams of said solution are mixed with 10 grams of SAE 20 motor oil.
(c) 20 grams of said solution are mixed with 5 grams of SAE 20 motor oil.

Mixes (a), (b), and (c) are heated to 95° C. on a steam bath while being nitrogen sparged to strip out the methylene chloride. They are then allowed to cool to 25° C. and there are obtained greases or gels (a), (b), and (c). Grease (a) is soft and (c) is quite stiff.

PERCENT ASH—ASTM METHOD D–128–61

|  | Percent ash |
|---|---|
| Commercial Cup Grease Lubricant #3 | 4.0 |
| Grease (a) | 0.0 |

MELTING POINTS—ASTM METHOD D–127–60

| | °C. |
|---|---|
| Commercial Grease Lubricant #3 | 94 |
| Grease (a) | 57 |
| Grease (b) | 75 |
| Grease (c) | 105 |

By regulating the proportion of the polypeptide dissolved in the oil, greases of varying stiffness and melting point can be obtained. These novel greases have the added advantage of being ashless upon ignition.

EXAMPLE T–8

Preparation of another ashless grease

An ashless grease softer than the grease (a) in the preceding examples is made in the same manner as that set forth in the preceding examples, except that 10 grams solution of the copolymeric product (Product P–9) in 3% concentration is substituted for the corresponding amount of solution in mix (a) thereof.

By varying the proportion and/or using different copolymers of this invention, greases of varying stiffness may be produced.

EXAMPLE T–9

Preparation of thickened hydrocarbon solvent 4 grams of poly-ω-n-octyl-L-glutamate (Product P–6) is dissolved in 96 grams of methylene chloride to provide a 1% solution. 10 and 5 grams respectively of said solution are added to separate vessels, each containing 20 grams of "Esso Hydrocarbon Solvent #100 (neutral)" having a viscosity (Brookfield) at 25° C. of 0.79 centipoise. The mixes are nitrogen sparged while being heated to 95° C. to strip off all the methylene chloride and then are cooled to 25° C. The resultant solutions, respectively containing 0.5% and 0.25% of Product P–8, have viscosities (Brookfield) at 25° C. of 2550 and 731 centipoises.

EXAMPLES T–10 AND T–11

Incorporation of P–1 and P–4 into polyolefin

Into a stoppered flask are charged 6 grams of Product P–1 and 40 ml. of benzene, and the mix is permitted to stand for 48 hours whereupon it completely swells into a thick dispersion. Then 500 ml. of benzene are added thereto to increase the fluidity thereof for further processing. 72 ml. of said solution are added to 43 grams of powdered polypropylene and the components are mixed thoroughly. The benzene is then evaporated off and the last traces thereof are removed in a vacuum oven at 31 mm. of mercury vacuum for 2 hours at 60° C. Then one quarter of the dried material is placed in a mold (3" x 3" x 30 ml.) and heated to 210° C. After 20 minutes at that temperature, the mold is placed in a cold press and subjected to pressure of 20,000 p.s.i. The resulting molded Pad (a) containing Product P–1 therein is compared with a control pad and is found to be more flexible and resistant to cold-cracking than the control.

Employing the same procedure as before except that 6 grams of Product P–4 are substituted for P–1, there is obtained Pad (b), of similarly improved characteristics.

Larger samples are treated using ASTM D–747–61T and the aforesaid results are corroborated and are as follows:

Stiffness in flexure, $\times 10^5$ p.s.i.:

| | |
|---|---|
| Control | 1.54 |
| Pad (a) | 1.32 |
| Pad (b) | 1.38 |

EXAMPLE T–12

Direct incorporation of Product P–2 into wax

One gram of Product P–2 is solubilized by heating it in admixture with 20 grams of paraffin wax on a hot plate. It is necessary to heat the mix to 250° C. to effect complete dispersion. The resulting hot mass is stringy and gelled before final solidification. When cast into thin films, it is considerably more flexible than the wax control.

One gram of Product P–1 instead of P–2 is used and similar results are obtained. A lower temperature, 180° C., is required to solvate the P–1.

EXAMPLE T–13

Indirect incorporation of Product P–1 into wax

To 5 grams of paraffin wax and 5 grams of Product P–1 are added 20 grams of methylene chloride. The mix is heated to refluxing conditions under a reflux condenser and so maintained for 1–2 hours, whereupon complete dispersion is achieved. The methylene chloride is completely stripped out by first heating to 100° C. and then in a vacuum oven at 80° C. for 2 hours. The resulting product is quite flexible in thick castings (¼") at 25° C.

EXAMPLE T–14

Direct incorporation of Product P–4 into corn oil

One gram of Product P–4 is added to 49 grams of corn oil in a stirred 3-neck flask including a thermometer and nitrogen sweep. Heat is applied, whereupon P–4 begins to solvate at about 55° C. To hasten solvation, the temperature of the mass is raised to 100° C. and maintained at 100° C. for 2 hours for effecting complete solvation. The mass, which is a solution or blend, is cooled to 25° C. at which temperature it is a hard, homogeneous gel free of insolubilized material.

EXAMPLE T–15

Direct incorporation of Product P–2 into corn oil

One-half gram of Product P–2 is added to 49 grams of corn oil with stirring, which is continued while the temperature of the mass is raised to and maintained at 180° C. for 1 hour. Upon cooling, the mass has gelled but is not firm and can be poured with clumping.

EXAMPLE T–16

Direct incorporation of Product P–4 into a blend of corn oil and "Crisco"

One-half gram of Product P–4 is added to 99 grams of a 1:1 blend of "Crisco" and corn oil with stirring which is continued while the temperature thereof is increased to and maintained at 180° C. for 1 hour. Upon cooling, the novel mass solidifies. A control blend is slushy. The novel solidified mass exhibits a modified crystalline structure and a smoother surface appearance than the original "Crisco." It also exhibits less syneresis than all liquid fat-Product P–4 combination. It exhibits excellent margarine-forming characteristics and should be useful in diets where high unsaturated fat levels are desirable.

EXAMPLE T–17

Indirect incorporation of Product P–2 in wax-oil blends

One-tenth gram of Product P–2 is solubilized in 20 grams of methylene chloride. To said solution is added 10 grams of a 3% wax-Welch pump oil mixture. The methylene chloride is stripped off by heating on a steam bath for 1½ hours, followed by an additional ½ hour at 45° C. in a vacuum oven (31" mercury vacuum). Then 60 grams of said wax-oil are added thereto, and the mass is heated to 65° C. to assure uniformity and lack of paraffin crystallinity. The mass is then placed in a refrigerator and cooled slowly, whereup it solidifies at −5° C. A wax-oil control is also placed in the refrigerator and solidifies at 9° C.

EXAMPLE T–18

Thickening of "Varsol 1" with P–4 and P–6

.1 gram of Product P–4 and Product P–6 respectively are dissolved in separate 100 ml. batches of "Varsol 1"

using methylene chloride as a transient solvent which is removed. The viscosity at 25° C. (Brookfield) of the "Varsol 1" is more than double with the viscosity of "Varsol 1" containing Product P-4 and is considerably greater than that containing Product P-6.

EXAMPLE T-19

Solidification of isopropyl myristate 5 grams of poly-ω-n-octadecyl - L-glutamate (Product P-4) are dissolved in 100 ml. of methylene chloride to make up a 5% solution (w./v.). A 10 ml. portion of said solution is mixed with 10 ml. of isopropyl myristate, then blown with nitrogen while warming on a steam bath up to 95° C. to strip off all of the methylene chloride. After cooling to 25° C., there is obtained a solid gel.

The expression "(w./v.)" as employed herein means grams per 100 milliliters.

While all of the specific esters and the polyamides produced therewith are derived from the L-amino acids and the n-alkyl alcohols employed, it is to be understood that the D- and mixtures of L- and D-amino acids may be substituted for the L-amino acids and that any other monohydric alcohol of the formula (R—CH$_2$—OH) may be used provided R is an alkyl radical, straight or branched chain, of at least 7 carbon atoms; and it is also to be understood that unless otherwise specified in the description and claims, that the term "glutamic acid" shall mean either D-, L- or mixtures of D- and L-glutamic acid and that the term "aspartic acid" shall mean either D-, L- or mixtures of D- and L-aspartic acid.

It should be understood that although this invention has been described with reference to particular embodiments thereof, changes and modifications may be made which are within its intended scope, and it should be limited only by the language of the appended claims.

What is claimed is:

1. A margarine composition comprising a major proportion of edible oils and fats of animal and vegetable origin useful as foodstuffs or in the preparation of foodstuffs and mixtures of said substances, and sufficient polyamide in which at least one of the following units selected from the group of units within the generic formula

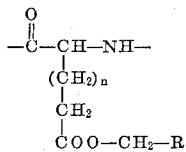

is present, R of each of said units being an alkyl radical of at least 7 carbon atoms and n of each of said units being independently selected from the group consisting of 0 and 1 to increase the viscosity at a temperature slightly above its melting temperature.

2. The composition of claim 1 comprising a major proportion of an edible oil and sufficient polyamide to increase the viscosity thereof at 25° C. by at least 100%.

3. The composition of claim 1 comprising a major proportion of a partially hydrogenated edible oil and sufficient polyamide to increase the viscosity thereof at a temperature slightly above its melting temperature.

4. The composition of claim 1 comprising a major proportion of an edible partially hydrogenated oil and sufficient polyamide to increase the stiffness thereof at 25° C.

5. The composition of claim 1 comprising a major proportion of a partially hydrogenated edible oil and sufficient polyamide wherein $n$ of some of said units equals 0 and of others equals 1, and the components are reacted in a ratio such that the resulting polyamide has a molecular weight of at least 5000, to increase the viscosity thereof at a temperature slightly above its melting temperature.

6. The composition of claim 5 comprising a major proportion of a partially hydrogenated edible oil and sufficient polyamide to increase the stiffness thereof at 25° C.

7. The composition of claim 5 comprising a major proportion of an edible oil and sufficient polyamide to increase the viscosity thereof at 25° C. by at least 100%.

8. A margarine composition comprising a major proportion of an edible oil useful as a foodstuff or in the preparation of foodstuffs and a sufficient proportion of a polyamide to increase the viscosity thereof at 25° C. by at least 100%, said polyamide consisting essentially of a recurring unit of the formula

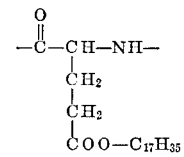

and having a molecular weight greater than 5000.

References Cited

UNITED STATES PATENTS 3,119,776  1/1964  Thomas et al. _____ 252—51.5
3,119,794  1/1964  De Vries et al. _____ 260—78

FOREIGN PATENTS 496,166  11/1938  Great Britain _____ 99—123

OTHER REFERENCES

Bailey, A. E.: Industrial Oil and Fat Products, Interscience Publ. Inc., 1951, N.Y., p. 409.

JOSEPH M. GOLIAN, Primary Examiner

U.S. Cl. X.R.

44—1, 7; 99—91, 118; 252—50; 260—27, 28.5